United States Patent [19]

Shono et al.

[11] 4,171,212

[45] Oct. 16, 1979

[54] MOLTEN GLASS SEPARATING DEVICE IN GLASS FIBER FORMING APPARATUS

[75] Inventors: Hiroaki Shono; Koji Nakazawa; Shinzo Ishikawa, all of Fukushima, Japan

[73] Assignee: Nitto Boseki Co., Ltd., Fukushima, Japan

[21] Appl. No.: 932,284

[22] Filed: Aug. 9, 1978

[30] Foreign Application Priority Data

Aug. 19, 1977 [JP] Japan .................................. 52-99167

[51] Int. Cl.² ............................................ C03B 37/02
[52] U.S. Cl. ........................................ 65/11 R; 65/12
[58] Field of Search ....................... 65/11 R, 11 W, 12

[56] References Cited

U.S. PATENT DOCUMENTS

| 2,457,777 | 12/1948 | Holtschulte et al. | 65/11 R X |
| 2,723,215 | 11/1955 | Biefeld et al. | 65/11 W X |
| 3,068,670 | 12/1962 | Russell | 65/12 |
| 4,088,467 | 5/1978 | Shono et al. | 65/2 |

Primary Examiner—Arthur D. Kellogg
Attorney, Agent, or Firm—Norbert P. Holler

[57] ABSTRACT

In a glass fiber forming apparatus comprising an orifice plate which has a large number of closely spaced orifices and has a flat undersurface and air is blown upwardly against said orifice plate during spinning operation, means is provided for mechanically separating into individual glass fibers a mass of molten glass adhering to the undersurface of the orifice plate in flooding condition before spinning is started or after all glass fibers are broken. The separating means is a clamping means so constructed and arranged as to clamp a mass of molten glass, means for moving said clamping means between a waiting position at which said clamping means will not interfere with the stream of filaments in the normal spinning operation and an operative position at which said clamping means can clamp a mass of molten glass, and means for causing said clamping means to open or close.

10 Claims, 11 Drawing Figures

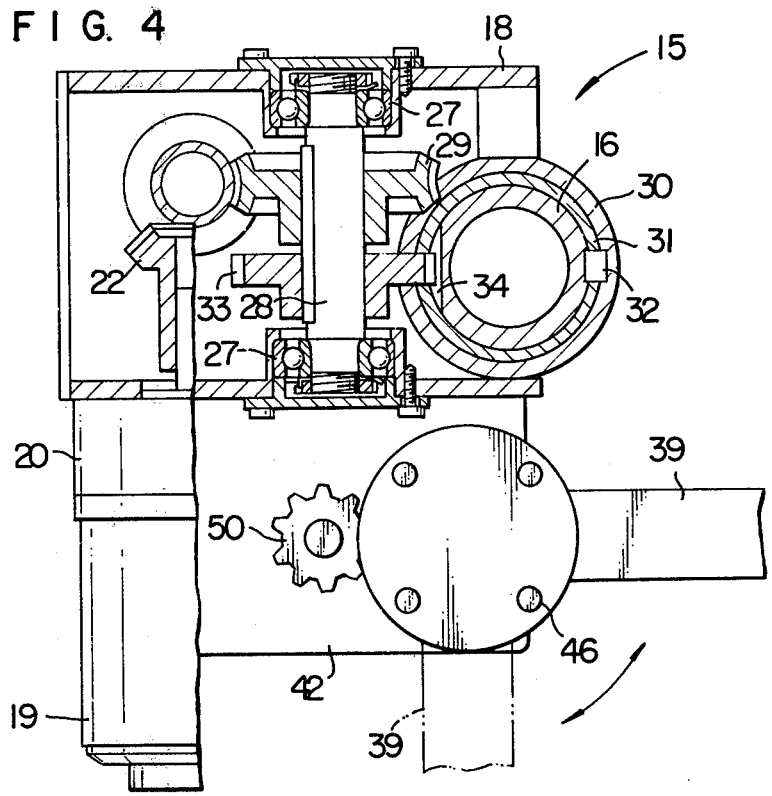
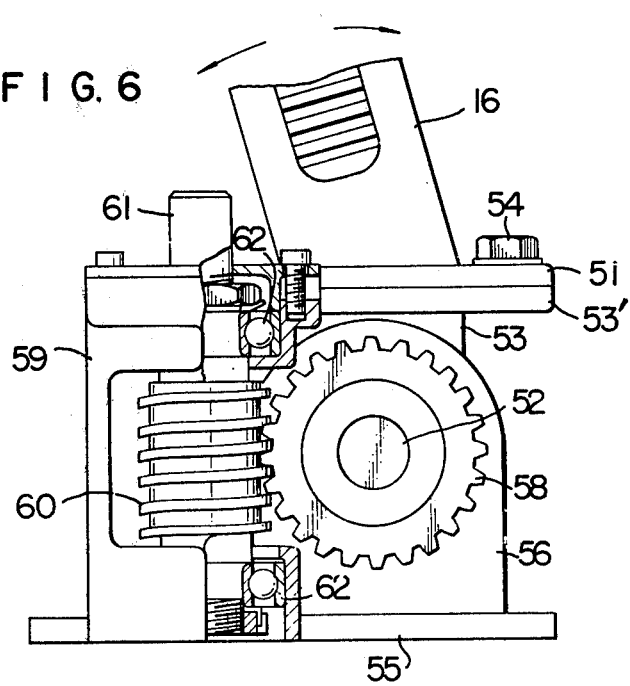

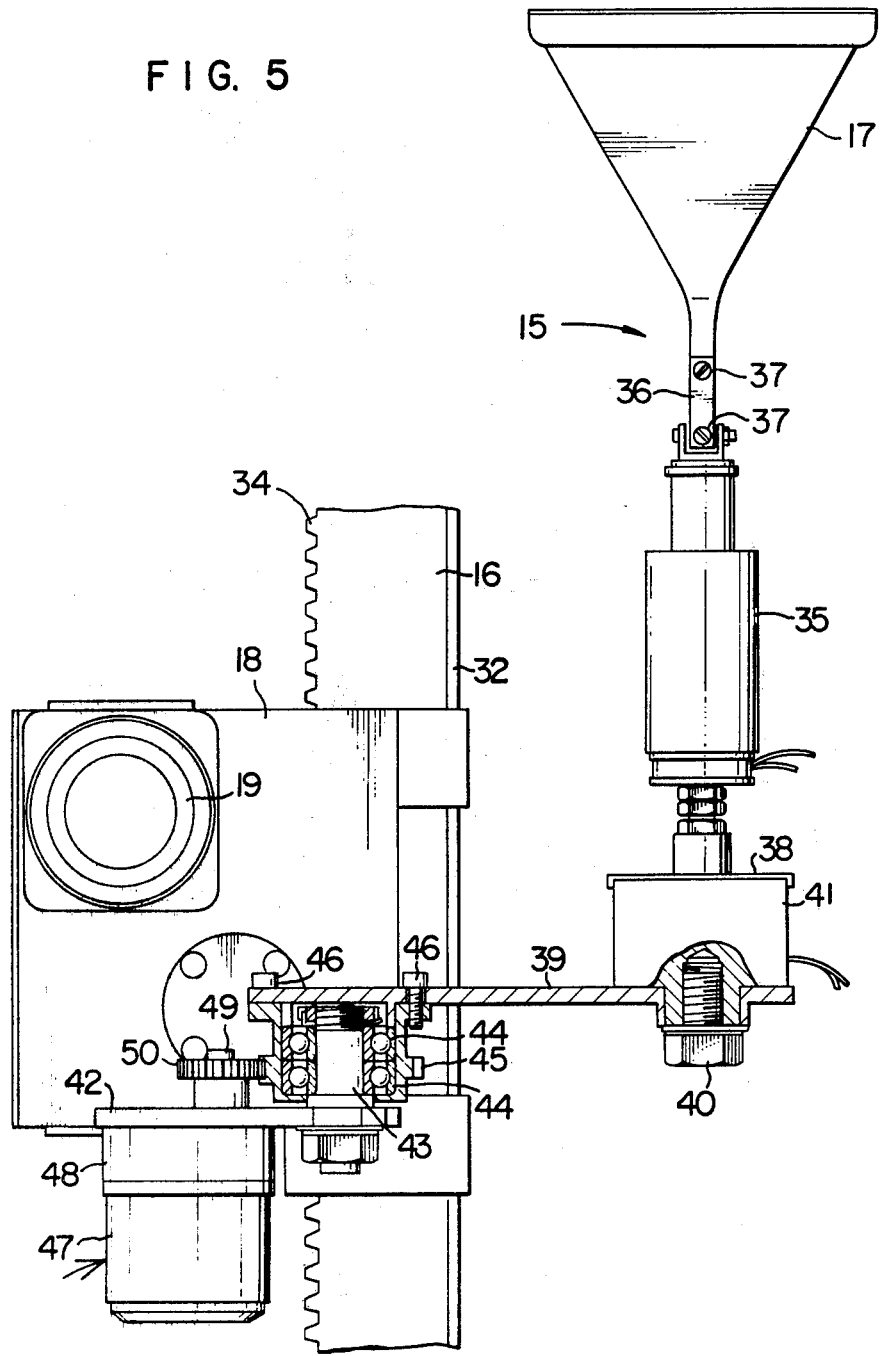

MOLTEN GLASS SEPARATING DEVICE IN GLASS FIBER FORMING APPARATUS

The present invention relates to a molten glass separating device in a glass fiber forming apparatus.

When glass fibers are spun from an orifice plate which has a large number of orifices consisting of simple plain holes and a flat undersurface and when the distance between orifices is too short, adjacent cones of molten glass formed by molten glass flowing through orifices on the undersurface of the orifice plate coalesce themselves so that spinning cannot be continued and consequently the distance between orifices is limited. Recently, U.S. Pat. No. 3,905,790 discloses a method for blowing air upwardly against an orifice plate thereby preventing the coalescence of glass cones between orifices spaced apart by a small distance, thereby permitting the spinning. Even with the above spinning method, prior to the operation or when all of the filaments are broken during the operation, molten glass adhere to the whole undersurface of the orifice plate and coalesce themselves and drop as one or more molten glass flows. Under these conditions, work is required for having all of the glass filaments flown through all of the orifices individually. Such work is called separation and has been accomplished manually in the following procedures:

(1) The orifice plate temperature is lowered by 20° to 60° C. lower than the temperature during the ordinary spinning operation.

(2) Air is blown through air nozzles which are disposed downwardly of an orifice plate in the amount of about ⅓ as less as the amount of air blown during the normal operation.

(3) With a pincers or the like, a mass of molten glass having down from the orifice plate is gripped.

(4) Pincers is gradually pulled downwardly while gripping the mass of molten glass.

(5) Separation is started from rear orifices which are on the side of the air nozzles, and as the pulling operation proceeds, the separation is spread gradually forwards.

(6) When the separation reaches the front of the orifice plate, the flow rate of glass passing through the orifices is increased and so that the glass cones tend to coalesce themselves again. Accordingly the amount of air should be gradually increased. In this case, the orifice plate is exposed so that the cooling to the orifice plate itself is increased. Therefore temperature should be gradually raised so that the flow rate of glass will not be reduced again.

(7) When the separation over all orifices is accomplished, the temperature and air amount are increased to those during the normal operation. During this procedure, by the manual operation the pulling work is continued at a speed of 3 to 70 cm per minute and at the same time the air amount and temperature are adjusted.

In order to smoothly accomplish the separation described above, the following conditions are required:

(i) The orifice plate must not be wetted with molten glass. In order to make it difficult to be wetted, it is necessary to lower the temperature.

(ii) A suitable amount of glass must be supplied through the orifices. When glass is cooled and its flow rate is extremely reduced, the thermal capacity carried by glass is reduced so that cooling is further enhanced. Consequently the flow of glass is stopped and the filaments are broken so that the separation becomes impossible. Therefore while the air cooling is enhanced, the orifice plate temperature must be raised.

The adjustments of air and temperature during the separation work described above are made by a skilled worker while watching the conditions very carefully. Especially, the step for continuously pulling glass manually requires close attention and patience and frequently results in failure. Once the pulling step fails, in most cases the separation work must be restarted again from the beginning.

Failure in pulling step is caused mainly under the following conditions:

(i) When glass is downwardly pulled immediately after the starting of the pulling step, a certain amount of glass flows through orifices so that the weight of glass to be held by hands of the worker is increased. When the worker leaves hands off glass, glass drops at a high speed, resulting in breaking glass filaments. Therefore the worker must try to support the weight of the glass rather than to pull it and must exert suitable pulling force to glass. However with an orifice plate having a large number of orifices, say, 3000 to 4000, glass flowing through these orifices has a considerable weight so that to shift glass from one hand to the other and very small movement of the worker's hand gives stress to glass wherein thermal strain remains so that part or whole of glass is destroyed. When glass is broken, the pulling force is decreased and the flow rate of glass is reduced so that the orifice plate is overcooled and consequently the separation cannot be continued.

(ii) When the pulling force is lost because glass which is being pulled entangles with air nozzles and a size applicator.

(iii) When the increase in the amount of air is too rapid during the work, resulting in overcooling.

(iv) In shifting glass from one hand to the other, the worker acts to exert force only in the horizontal direction not in the downward direction. In these cases, the separated glass is immediately broken.

The above failures are almost caused by carelessness, fatigue and inexperience of a worker. During the work, the worker must maintain the arm force so as to pull glass very slowly and very carefully at a constant speed in a predetermined direction under the conditions in which the worker receives radiant heat and hot air reflected back from the orifice plate. Furthermore the worker cannot leave hands from glass however hard he is tired or exhausted. Failure tends to occur especially when he changes the tired hand to the other so that the pulling direction is slightly deviated. It is a very hard and tense labor for a worker to accomplish the complete separation under such severe conditions.

SUMMARY OF THE INVENTION

Accordingly, one of the objects of the present invention is to mechanize the separation of glass, whereby workers may be freed from the manual and hard work and at the same time the separation failure may be reduced and productivity may be enhanced.

To this end the present invention provides a glass fiber forming apparatus of the type having an orifice plate with a plurality of closely spaced orifices and a flat undersurface, means for downwardly drawing glass cones formed under said orifices to form into glass fibers, and means for blowing cooling air against the undersurface of said orifice plate, in which means is provided for separating a mass of molten glass adhered to the undersurface of said orifice plate in floading condition into individual glass fibers, said separating means comprising an elongated stationary shaft standing on a floor spaced below said orifice plate at a position out of the stream of glass fibers and extending toward said orifice plate, a carrier movable along said shaft, means mounted on said carrier for releasably clamping said mass of molten glass, and a drive means for moving up and down said carrier to and from a position which may enable said clamping means to reach said mass of molten glass.

The above and other objects, features and advantages of the present invention will become more apparent from the following description of one preferred embodiment taken in conjunction with the accompanying drawings.

FIGS. 3 to 5 are side view, top view and front view, all on enlarged scale, illustrating in section the essential parts of the separating device shown in FIG. 1;

FIGS. 6 and 7 are side and front views, on enlarged scale, illustrating in section the essential parts of a mechanism for adjusting an angle of inclination of a slide shaft for guiding the separating device shown in FIG. 1;

Figure 1:
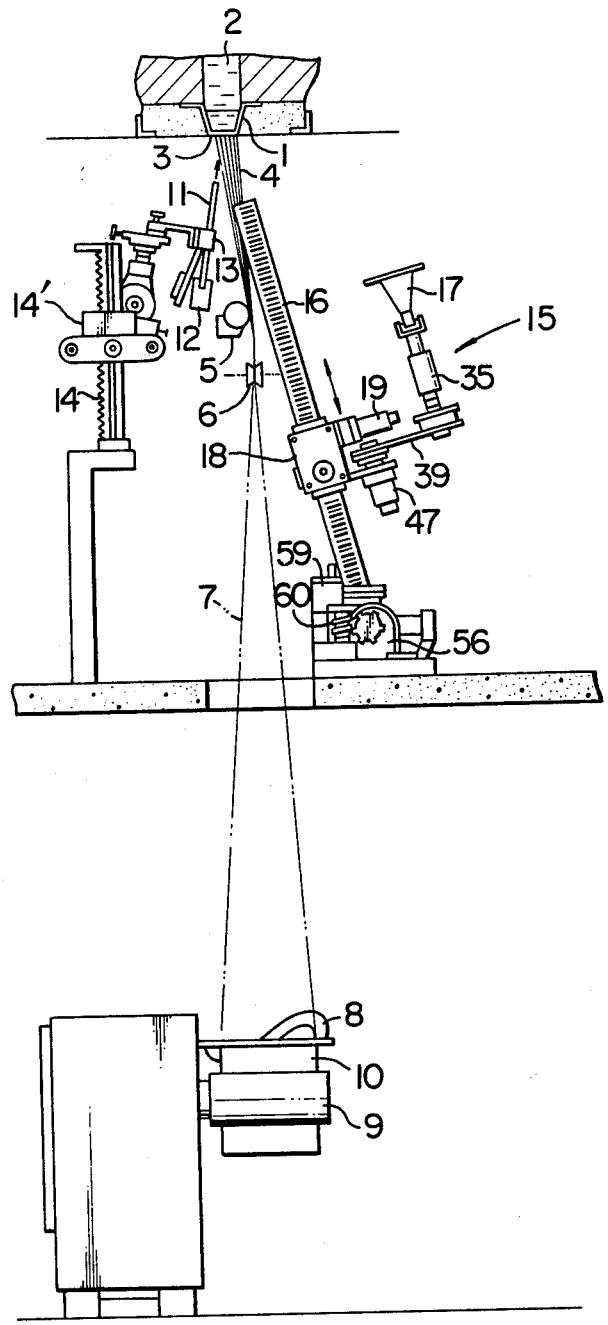
FIGS. 1 and 2 are side and front views of a glass fiber forming apparatus with a separating device in accordance with the present invention, respectively.
Figure 2:
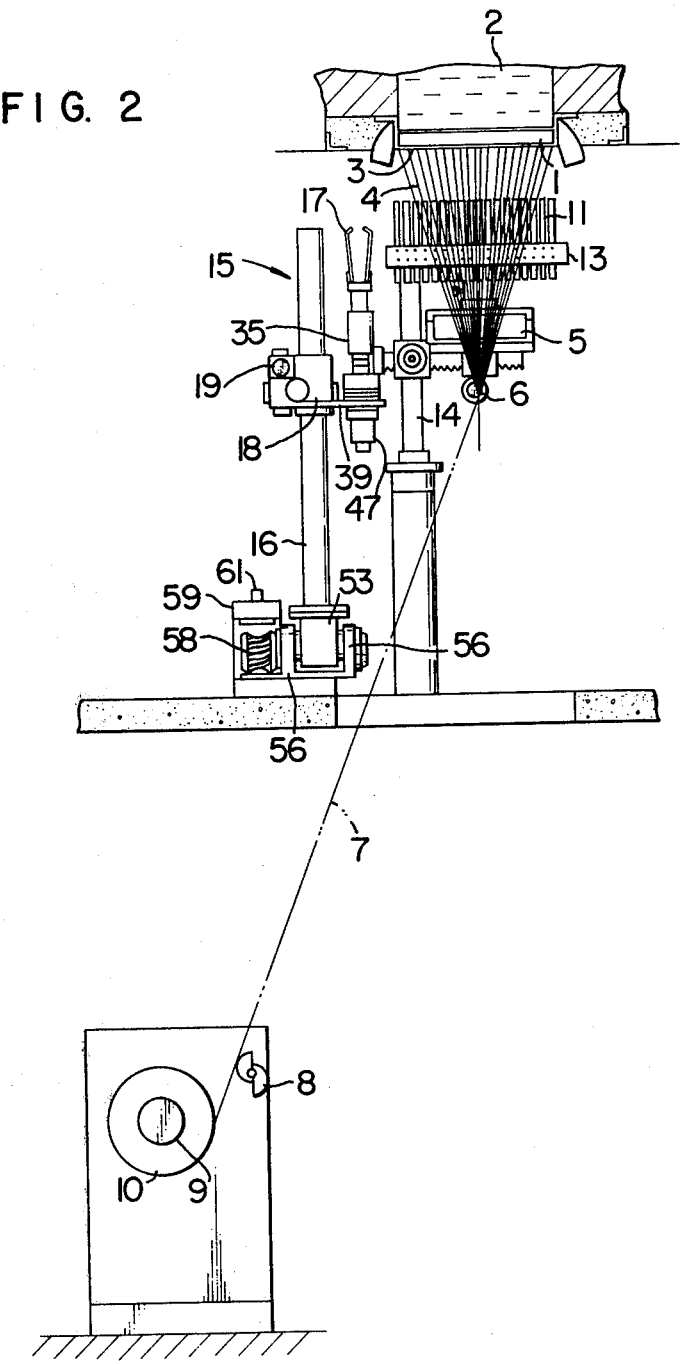

Next referring to the accompanying drawings, one preferred embodiment of the present invention will be described. FIGS. 1 and 2 show the whole arrangement of a glass fiber forming apparatus provided with a separating device in accordance with the present invention the reference numeral 1 denotes a spinning furnace filled with molten glass 2; and the reference numeral 3, an orifice plate having a flat undersurface and attached to the bottom of the spinning furnace 1 and formed with a large number, for instance 4000 to 6000, of plain hole orifices spaced apart from each other by a distance less than 3 mm. The distance between the orifices is such that adjacent cones formed on the undersurface of the orifice plate by molten glass flowing out of the individual orifices coalesce themselves normally, but air streams are blown against the orifice plate 3 through air nozzles 11 each of which consists of a pipe and which are disposed below the spinning furnace 1, whereby the molten glass cones are cooled and separated from each other. Each cone is continuously drawn into a filament 4, and after having been applied at a size applicator 5 with a lubricating agent or a coating substance, the filaments 4 pass a gathering roller 6 to be formed into one or more strands 7. The strand 7 passes a traverse guide 8 and is wound around a spindle shaft 9 at a speed of 500 to 2000 m/min so as to be formed into a package 10. A hose 12 is connected to the air nozzles 11, and low pressure air is supplied by a compressor or a blower connected to the hose 12. A plurality of pipes which constitute the air nozzles 11 are securely fixed in one row on a support 13 which in turn is mounted on a position adjusting means 14' vertically movable along a strand 14 erected vertically on a floor in a spinning room. Thus the direction and up and down, right and left and front and rear positions of the air nozzles 11 may be adjusted optimumly.

Figure 3:
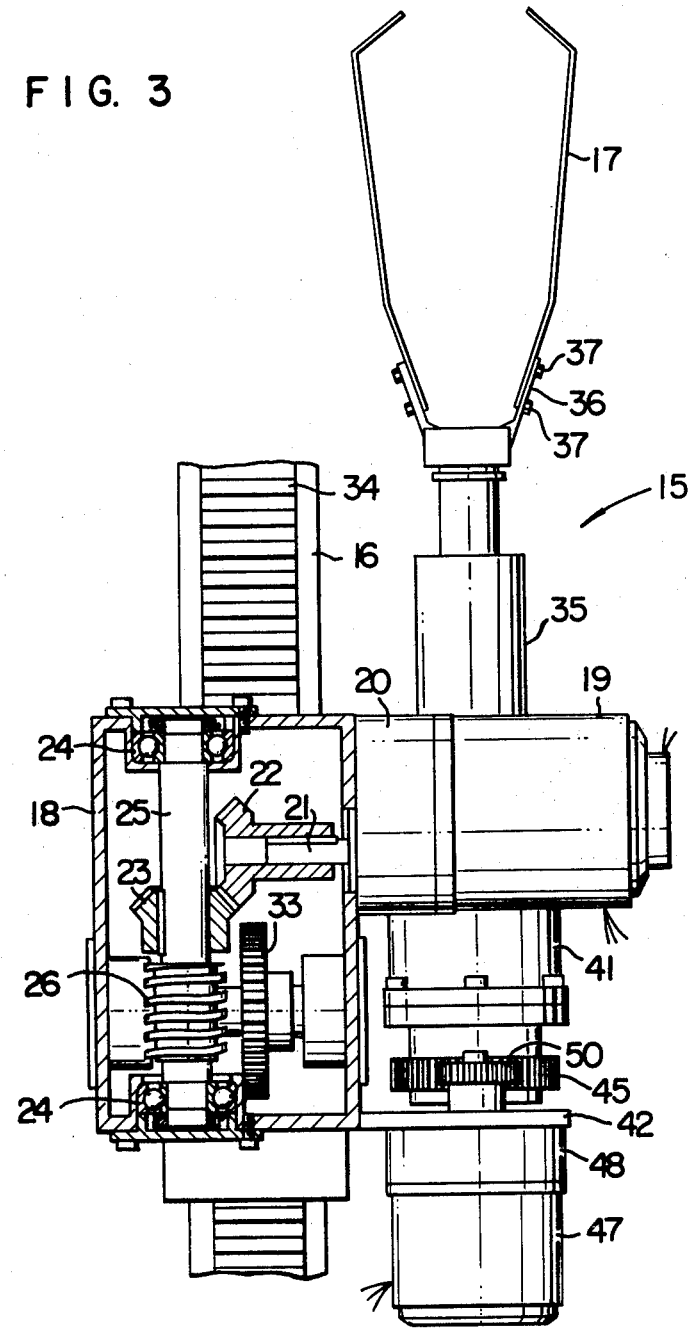

The reference numeral 15 denotes a separating device in accordance with the present invention which is so designed and constructed that it may be moved up and down along a slide shaft 16 which in turn is arranged to extend slantingly relative to the spinning furnace at a position outside of the area immediately below the spinning furnace 1. As best shown in FIGS. 3-5, the separating device 15 has a clamp 17 consisting of a pair of gripping members made of a heat-resisting alloy and formed with sawtooth blades at the leading ends thereof, and this clamp 17 is mounted on a slide box 18 movable up and down along the slide shaft 16. Disposed at one side of the slide box 18 are a reversible variable speed motor 19 and a reduction gear 20 which is directly connected to the motor 19. A bevel gear 22 is securely attached to the output shaft 21 of the reduction gear 20, and a bevel gear 23 which is in mesh with the gear 22 is securely attached to a worm shaft 25 which in turn is supported by a pair of bearings 24 within the slide box 18. A worm 26 provided on the worm shaft 25 is in mesh with a worm wheel 29 securely attached to a counter shaft 28 which is supported by a apir of bearings 27 within the slide box 18 at right angle to the worm shaft 25 (See FIG. 4). The slide box 18 has an integral cylindrical bracket 30 having a bore surrounding the slide shaft 16 and is slidable along the slide shaft 16 through a metal bushing 31 attached in the interior surface of the bracket 30 and is prevented from the rotation by means of a key 32 fitted into the slide shaft 16. A spur gear 33 is securely attached to the counter shaft 28 and the spur gear 33 is in mesh with a rack 34 formed on the slide shaft 16 through a slot formed through the bracket 30 in opposed relationship therewith. With the above arrangement, the rotation of the motor 19 is transmitted to the spur gear 33 through the reduction gear 20, the bevel gears 22 and 23, the worm 26 and the worm wheel 27. As a result of the rotation of the spur gear 33 in mesh with the rack 34, the slide box 18 moves up or down along the slide shaft 16.

Each of the gripping members of the clamp 17 is connected with bolts 37 to a finger 36, which is called a solenoid finger, of an electromagnetic automatic actuating switch 35 and when the switch 35 is energized, the clamp 17 is closed. As shown in FIG. 5, the electromagnetic automatic actuating switch 35 is erected upright on a supporting plate 38 which is placed on an electromagnet 41 securely attached with a bolt 40 to the leading end of a rotary arm 39 extended from the slide box 18 and which is securely fixed to the electromagnet 41 during energization of the latter. When the electromagnet 41 is deenergized, the electromagnetic automatic actuating switch 35 and hence the clamp 17 may be removed from the rotary arm 39. The rotary arm 39 is securely attached with bolts 46 to the upper end of a gear 45 which is rotatable through bearings 44 around a shaft 43 securely attached to a base 42 of the slide box 18. The gear 45 is in mesh with a pinion 50 securely attached to an output shaft 49 of a reduction gear 48 directly connected to a motor 47 mounted on the undersurface of the base 42 of the slide box 18. When the motor 47 is driven in a suitable manner, the rotary arm 39 is rotated in the directions indicated by a double-pointed arrow in FIG. 4 to a desired position.

Figure 7:
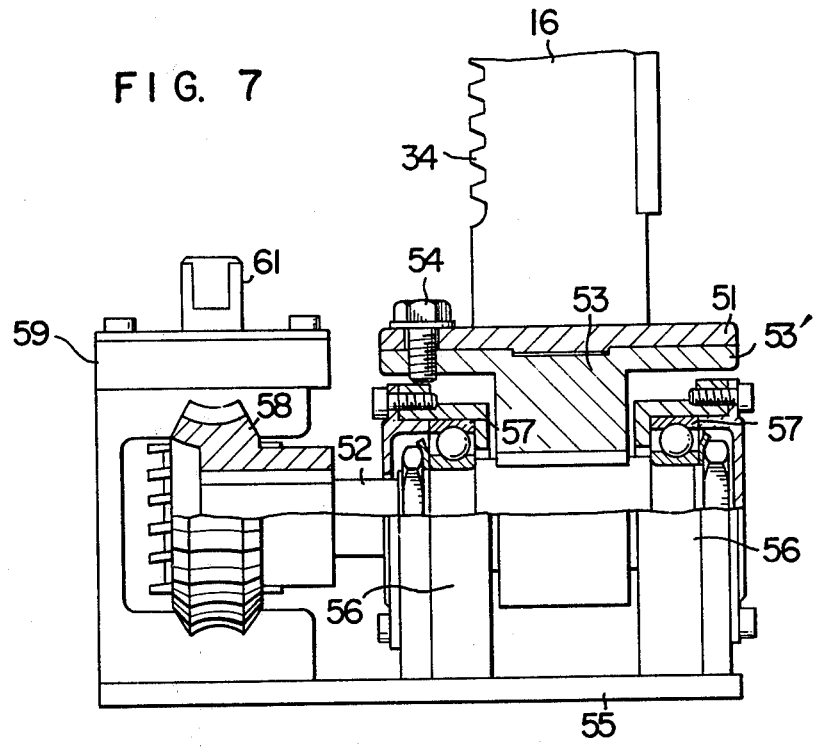

As shown in detail in FIGS. 6 and 7, the slide shaft 16 has a flange 51 formed integral with the lower end thereof and connected with bolts 54 of a flange 53' formed at the upper end of a bracket 53 keyed to a worm' wheel shaft 52. The worm wheel shaft 52 is supported by a pair of bearings 57 monted on a pair of supporting columns 56 erected upright on a base plate 55 anchored to the floor of the spinning room, and a worm wheel 58 is securely attached to one end of the worm wheel shaft 52. Upon the base plate 55 is mounted a frame 59 on one side of the pair of supporting columns 56, and a worm shaft 61 which is provided with a worm 60 in mesh with the worm wheel 58 and is extended vertically is supported by a pair of bearings 62 on the frame 59. When the upper end of the worm shaft 61 is turned with a monkey spanner or the like, the worm wheel 58 is rotated so that the slide shaft 16 is caused to swing in the directions indicated by arrows depending upon the direction of rotation of the worm wheel 58, whereby the angle of inclination of the slide shaft 16 may be varied. In this case, the worm has the self-tightening characteristic so that unless the worm shaft 61 is turned, the slide shaft 16 is maintained at a predetermined angle of inclination.

Figures 8A, 8B, 8C, 8D:
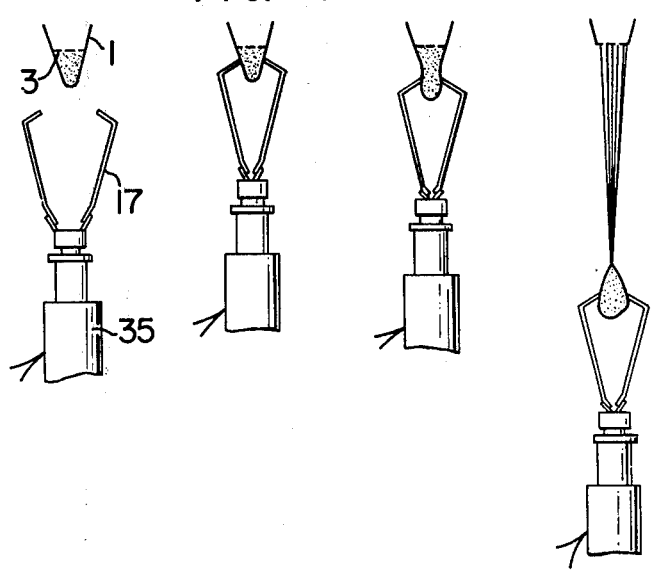
FIGS. 8a, 8b, 8c and 8d shows the steps of the separation by the separating device in accordance with the present invention.

Next the mode of operation of the separating device with the above construction will be described. The slide shaft 16 is maintained at a predetermined angle of inclination by the operation of the worm shaft 61, and during normal spinning operation the slide box 18 is located on the slide shaft 16 at a relatively lower position thereof as shown in FIG. 1 while the rotary arm 39 is located at an angular position at which the clamp 17 will not interfer with the stream of filaments drawn from the orifices. When the breakage of a filament or filaments is sensed by any suitable device, for instance, disclosed in Japanese Pat. application No. 51-116193, the slide box elevating motor 19 is energized so that the slide box 18 moves upwards along the slide shaft 16 and simultaneously the rotary arm turning motor 47 is energized so as to bring the clamp 17 to a position directed toward the center of the spinning furnace. When the clamp 17 reaches a position at which it may clamp the tip of a mass of molten glass hanging down from the orifice plate in a form of a large cone as shown in FIG. 8a. a limit switch (not shown) is actuated so that the slide box 18 is stopped and simultaneously the electromagnetic automatic actuating switch 35 is actuated so that the mass of molten glass is clamped as shown in FIG. 8b. Next the slide box elevating motor 19 is reversed in rotation so that the slide box 18 moves downwards at a predetermined speed, thereby pulling down the clamped molten glass as shown in FIG. 8c. As soon as the downward movement of the slide box has been started, the amount and pressure of air ejected out of the air nozzles 11 and the temperature of the orifice plate are adjusted so that the separation of the molten glass to filaments is started. When the clamp 17 is moved downwards to a certain position, the filaments are completely separated as shown in FIG. 8d. When it is observed that filaments have been completely separated from each other, the electromagnetic automatic actuating switch 35 is de-energized and the lumped glass attached to the leading ends of the filaments is removed and the clamp 17 is returned to its initial waiting position. Thus the spinning of separated filaments is started again.

As described above, according to the present invention, the molten glass separating and drawing operations are completely mechanized and may be completely automated with the combination of a suitable control system in a simple manner. Thus failure in separating work may be eliminated and man-power-savings may be also attained Various modifications in structure and/or function can be made by one skilled in the art to the disclosed embodiments without departing from the scope of the invention as defined by the claims.

What is claimed is:

1. In a glass fiber forming apparatus of the type having an orifice plate with a plurality of closely spaced orifices and a flat undersurface, means for downwardly drawing glass cones formed under said orifices to form into glass fibers, and means for blowing cooling air against the undersurface of said orifice plate, the improvement comprising means for separating a mass of molten glass adhered to the undersurface of said orifice plate in flooding condition into individual glass fibers, said separating means comprising an elongated stationary shaft standing on a floor spaced below said orifice plate at a position out of the stream of glass fibers and extending toward said orifice plate, a carrier movable along said shaft, means mounted on said carrier for releasably clamping said mass of molten glass, and a drive means for moving up and down said carrier to and from a position which may enable said clamping means to reach said mass of molten glass.

2. The improvement as set forth in claim 1 wherein a rack is formed on and extending along one side of said shaft over the whole length thereof, and said carrier is slidably fitted over said shaft and has a gear wheel in mesh with said rack and a reversible motor for driving said gear wheel through a reduction gear.

3. The improvement as set forth in claim 1 or 2 wherein said clamping means is mounted on the free ends of a rotary arm so pivoted to said carrier as to swing about an axis in parallel with said stationary shaft.

4. The improvement as set forth in claim 3 wherein said carrier has a reversible motor which rotates said arm through a reduction gear.

5. The improvement as set forth in claim 1 wherein said clamp means has a pair of clamping members which are made of a heat-resisting alloy and have the upper ends adapted to open and close.

6. The improvment as set forth in claim 5 wherein the upper ends of said pair of clamping members have sawtooth blades.

7. The improvement as set forth in claim 5 or 6 wherein the bases of said pair of clamping members are securely connected to a pair of fingers, respectively, which are disposed at the upper end of an electromagnetic automatic switch disposed upright at the free end of said arm and which are electromagnetically opened or closed.

8. The improvement as set forth in claim 7, wherein an electromagnet is attached to the free end of said arm and said electromagnetic automatic switch is removably mounted on said electromagnet.

9. The improvement as set forth in claim 1 wherein means is provided for adjusting the angle of said stationary shaft with respect to the floor.

10. The improvement as set forth in claim 9 wherein said angle adjusting means comprises a rotating shaft to which is connected the lower end of said stationary shaft and which is supported horizontally relative to said floor, a worm wheel securely attached on said rotating shaft and a worm in mesh with said worm wheel.

* * * * *